(No Model.)
T. A. EDISON.
MANUFACTURE OF CARBON FILAMENTS.
No. 485,615. Patented Nov. 8, 1892.
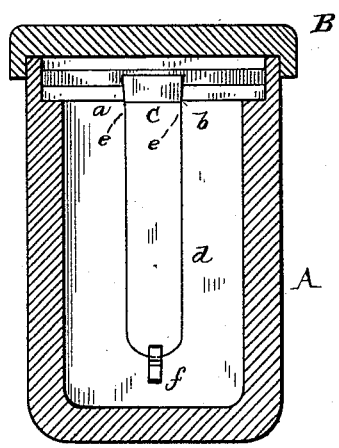
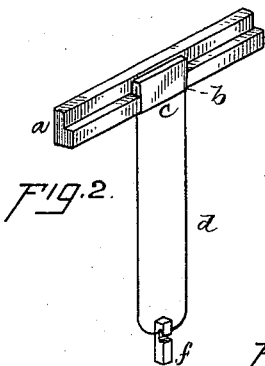
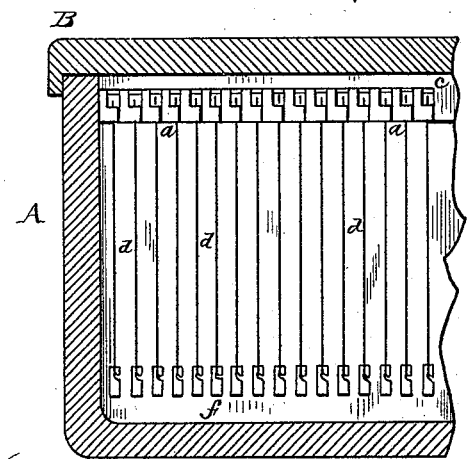
ATTEST:
E. C. Rowland
Wm. Pelzer
INVENTOR:
Thomas A. Edison
By Dyer & Seely
Attys

UNITED STATES PATENT OFFICE.

THOMAS A. EDISON, OF LLEWELLYN PARK, NEW JERSEY.

MANUFACTURE OF CARBON FILAMENTS.

SPECIFICATION forming part of Letters Patent No. 485,615, dated November 8, 1892.

Application filed December 15, 1886. Renewed April 12, 1892. Serial No. 428,783. (No specimens.)

*To all whom it may concern:*

Be it known that I, THOMAS A. EDISON, of Llewellyn Park, in the county of Essex and State of New Jersey, have invented a certain new and useful Improvement in the Manufacture of Carbon Filaments, (Case No. 705,) of which the following is a specification.

The object of my invention is to produce carbon filaments for incandescent electric lamps which shall have an even degree of carbonization throughout and will therefore be of even resistance and not liable to be distorted when heated electrically in the lamp. I accomplish this by carbonizing the filaments by radiated and convected heat and not by conduction, the filament being so placed in the carbonizing-chamber that it is not in heat-conducting contact therewith, but receives its heat by radiation and convection. By this means each filament becomes equally heated and equally carbonized throughout.

Means for carrying my invention into effect are illustrated in the accompanying drawings, in which—

Figure 1 is a cross-section at one end of the carbonizing-mold, showing its interior in end elevation; Fig. 2, a perspective view of a suspended filament, and Fig. 3 a section at one side of the chamber with the interior thereof shown in side elevation.

A represents a suitable carbonizing mold or chamber having a cover B and made of a material capable of withstanding high heat, preferably plumbago. Extending across the top of the chamber and resting upon shoulders therein are placed a number of bridges $a$ or supports for the filaments, preferably made of carbon. In a beveled recess $b$ in each bridge-piece a wedge-shaped piece of carbon $c$ is adapted to fit. Filaments $d\ d$ of carbonizable material are formed in arched or looped form by cutting and bending the same, as is well understood, and one of these is placed in the recess $b$ of each bridge-piece and held there by the insertion of a wedge $c$. Any desired number of such bridges each supporting a filament may be placed in a chamber, according to the length thereof, and the cover being then placed thereon and preferably luted at its edges the chamber is placed in a suitable furnace and heated to the high temperature necessary for carbonization. When the filaments are carbonized, they are removed and preferably broken off at points a little below the points of contact with the supports—for instance, at $e\ e$—so that the finished filament is carbonized wholly by radiated and convected heat and not by conduction from the walls of the chamber or any part in contact therewith. While I prefer to do this, I may make use of the whole of the original filament, practically all of which is thus carbonized by radiation. I suspend upon each filament before carbonization a small carbon weight $f$, which puts a strain upon the filament, and therefore keeps it in shape while being carbonized and at the same time permits it to contract.

All the parts of all the filaments in the chamber are equally heated instead of some parts receiving more heat than others, which occurs when the filaments are in contact with the mold, so as to receive convected heat.

It is evident that the manner of supporting the filaments and attaching the weights thereto may be modified in various ways without departing from the spirit of my invention.

What I claim is—

1. The herein-described improvement in the method of making incandescent conductors for electric lamps, consisting in suspending detached filaments of carbonizable material in a closed chamber out of contact therewith, suspending weights upon said filaments to place them under strain, and heating said chamber to carbonizing heat, and breaking off said filaments below the point of suspension, substantially as described.

2. The herein-described improvement in the method of making incandescent conductors for electric lamps, consisting in suspending filaments of carbonizable material in a closed chamber, exposing said chamber to carbonizing heat, and breaking off said filaments below the point of suspension, substantially as set forth.

3. The combination, with the carbonizing-chamber, of the recessed bridge-pieces and the wedges for holding the filaments, substantially as set forth.

This specification signed and witnessed this 6th day of December, 1886.

THOS. A. EDISON.

Witnesses:
WM. PELZER,
E. C. ROWLAND.